United States Patent [19]

Ueda et al.

[11] Patent Number: 4,845,764
[45] Date of Patent: Jul. 4, 1989

[54] SHAPE RECOGNITION APPARATUS

[75] Inventors: Hideshi Ueda, Yao; Kazumasa Okumura, Uji; Masamichi Morimoto, Osaka; Yoshikazu Okahashi, Ikoma, all of Japan

[73] Assignee: Matsushita Electric Industrial Co., Ltd., Kadoma, Japan

[21] Appl. No.: 74,186

[22] Filed: Jul. 16, 1987

[30] Foreign Application Priority Data

Jul. 17, 1986 [JP] Japan .............................. 61-168347
Jul. 18, 1986 [JP] Japan .............................. 61-170038
Oct. 6, 1986 [JP] Japan .............................. 61-237352

[51] Int. Cl.$^4$ .............................................. G06K 9/46
[52] U.S. Cl. ......................................... 382/8; 382/25; 382/48
[58] Field of Search ................ 382/8, 25, 48; 358/101

[56] References Cited

U.S. PATENT DOCUMENTS

| 4,490,848 | 12/1984 | Beall et al. ............................. 382/25 |
| 4,493,105 | 1/1985 | Beall et al. ............................. 382/25 |
| 4,703,512 | 10/1987 | Saka et al. ............................. 382/25 |
| 4,747,153 | 5/1988 | Kouno et al. ......................... 382/22 |

Primary Examiner—Thomas H. Tarcza
Assistant Examiner—Ian J. Lobo
Attorney, Agent, or Firm—Cushman, Darby & Cushman

[57] ABSTRACT

A shape recognition apparatus for detecting a boundary of an object using a video camera converts an image signal to a binary signal, and detects boundary points showing the boundary from the binary signal, Then, boundary angle and average of boundary angle difference are calculated based on the boundary points, and thereby corners of the boundary are recognized.

6 Claims, 15 Drawing Sheets

SHAPE RECOGNITION APPARATUS

FIELD OF THE INVENTION AND RELATED ART STATEMENT

1. FIELD OF THE INVENTION

The present invention relates generally to a shape recognition apparatus, and more particularly to an apparatus for recognizing a shape of an object by processing data in contour thereof.

2. DESCRIPTION OF THE RELATED ART

Recently, a shape recognition apparatus has been introduced in an inspection apparatus and an electronic parts mounting apparatus for factory automation, etc., and a higher precision and speed in data processing is especially required in the shape recognition apparatus of the field.

An example of the shape recognition apparatus in the prior art which recognizes a shape on the basis of contour information of an object is shown in FIG. 11, FIG. 12(a) and FIG. 12(b). FIG. 11 is a block diagram showing the shape recognition apparatus for recognizing leads of an integrated circuit in the prior art. Referring to FIG. 11, a CCD videocamera 162 detects leads 161 of the integrated circuit such as quad-in-package integrated circuit. A shape recognition circuit 163 is composed of a binary converting circuit or means 164 for converting the video signal from the videocamera 162 to a signal showing a silhouette of the leads 161, a templet matching part or means 165 and shape recognition part or means 166.

The operation of the shape recognition circuit 163 is elucidated referring to FIG. 12(a) and FIG. 12(b). An image field 171 shows an image which is detected by the videocamera 162, and a silhouette 172 of the leads 161 is shown in the image filed 171. Rectangular portions 173, 174, 175 and 176 in the silhouette 172 show the leads 161. A predetermined reference patterns 177 and 178 for operating the templet matching are shown in FIG. 12(b).

The video signal of the image which is represented by the silhouette 172 by the binary converting circuit 164 is inputted to the templet matching part 165, and is compared with the reference pattern 177 and 178. When a corner 180 of the silhouette 173 substantially coincides with the reference pattern 177 and a corner 181 substantially coincides with the reference pattern 178, it is recognized that the silhouette 173 is one of the leads 161 of the integrated circuit. The positions of the corners 180 and 181 are calculated on the basis of the positions of the reference patterns 177 and 178 in the shape recognition part 166.

In the above-mentioned prior art, when the integrated circuit is rotated with respect to a normal position or the shape of the leads is distorted, the shape recognition is impossible. Another example of the shape recognition apparatus in the prior art for solving the above-mentioned problem is elucidated hereinafter. Referring to FIG. 13(a) and FIG. 13(b), a boundary of a silhouette 143 is detected by the following boundary detection process. In the boundary detection process, a mask 150 which is a square region formed by nine square cells 142, for example, are defined as shown in FIG. 13(b), and the boundary of the silhouette 143 is traced by the mask 150. In the boundary detection process, when at least the central cell 191 exists in the silhouette 143 and some cells 192–195 are outside of the silhouette 143, it is recognized that the central cell 191 of the mask 150 is on the boundary. The mask 150 is shifted clockwise along the boundary as shown by allows 145, and boundary directions which are detected by the boundary detection process change in 45° as a rule. The boundary 145 which is detected by the above-mentioned boundary detection process is shown in FIG. 13(a).

Subsequently, a difference of the respective angles of directions of neighboring two boundary parts is calculated, and an angle difference function is defined. A graph showing the angle difference function in the ordinate and a distance of the boundary in the abscissa is shown in FIG. 14. Referring to FIG. 14, peaks 153 show the maximum angle difference function and are recognized as tops of corners on the boundary.

In the shape recognition apparatus in the above-mentioned prior art, the shape can be recognized regardless of rotation and slight distortion of the object, and furthermore, a very small concavity and convexity can be detected by employing a small size mask 150. However, the detection of a corner having a large curvature radius is difficult in the conventional art.

OBJECT AND SUMMARY OF THE INVENTION

An object of the present invention is to provide a shape recognition apparatus which is capable of recognition of a shape of an object regardless of rotation of the object or distortion of the shape thereof.

Another object of the present invention is to provide a shape recognition apparatus which is capable of precise detection of a shape of an object having a plurality of complicated corners.

A shape recognition apparatus in accordance with the present invention comprises:

a video device for detecting a shape of an object, to produce a video signal of the shape, means for converting the video signal to a binary signal, means for detecting a boundary point to be noted on a contour of the shape shown from the binary signal, means for producing data of a row of the boundary points starting from the boundary point to be noted and along the contour around the shape, means for forming a shape table including data of the shape and shape and direction of corners on the contour and distances between the respective neighboring corners from data of the row of the boundary points, and means for recognizing the shape of the object by comparing the table with a reference shape table.

BRIEF DESCRIPTION OF THE DRAWINGS

FIG. 4(c) is a figure showing angles of lines $V_0$, $V_1$, $V_2 \ldots V_1$.

DESCRIPTION OF THE PREFERRED EMBODIMENT

Figure 1:
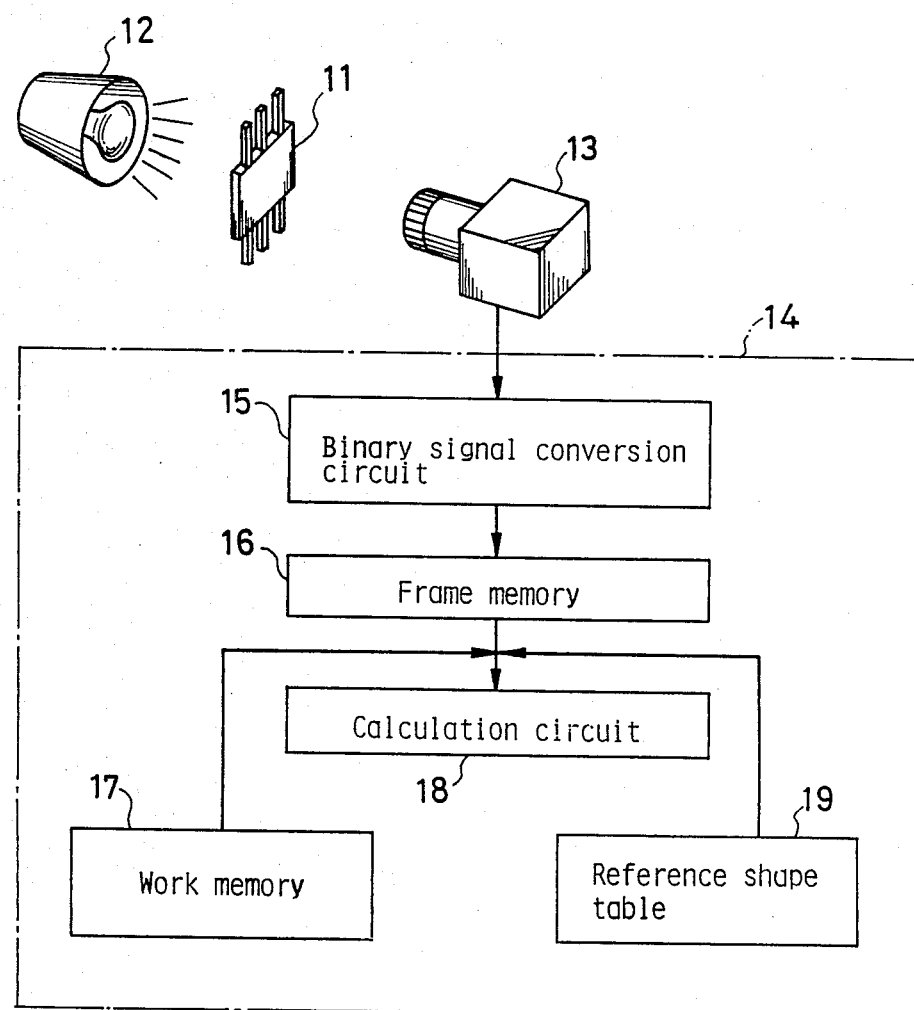
FIG. 1 is a block diagram of a shape recognition apparatus of a first embodiment in accordance with the present invention.

FIG. 1 is a block diagram of a shape recognition apparatus 14 of a first embodiment in accordance with the present invention. Referring to FIG. 1, an object 11 is illuminated by an illuminating apparatus 12. A videocamera 13 faces the illuminating apparatus 12, and the object 11 is arranged in between. A shape recognition apparatus 14 comprises an image converting circuit 15 for converting a video signal from the videocamera 13 to a binary signal showing a silhouette of the object 11, a frame memory 16 for memorizing the binary signal, a work memory 17, a calculation circuit 18 and a memory for memorizing a reference table 19 for detecting boundary.

Figure 2:
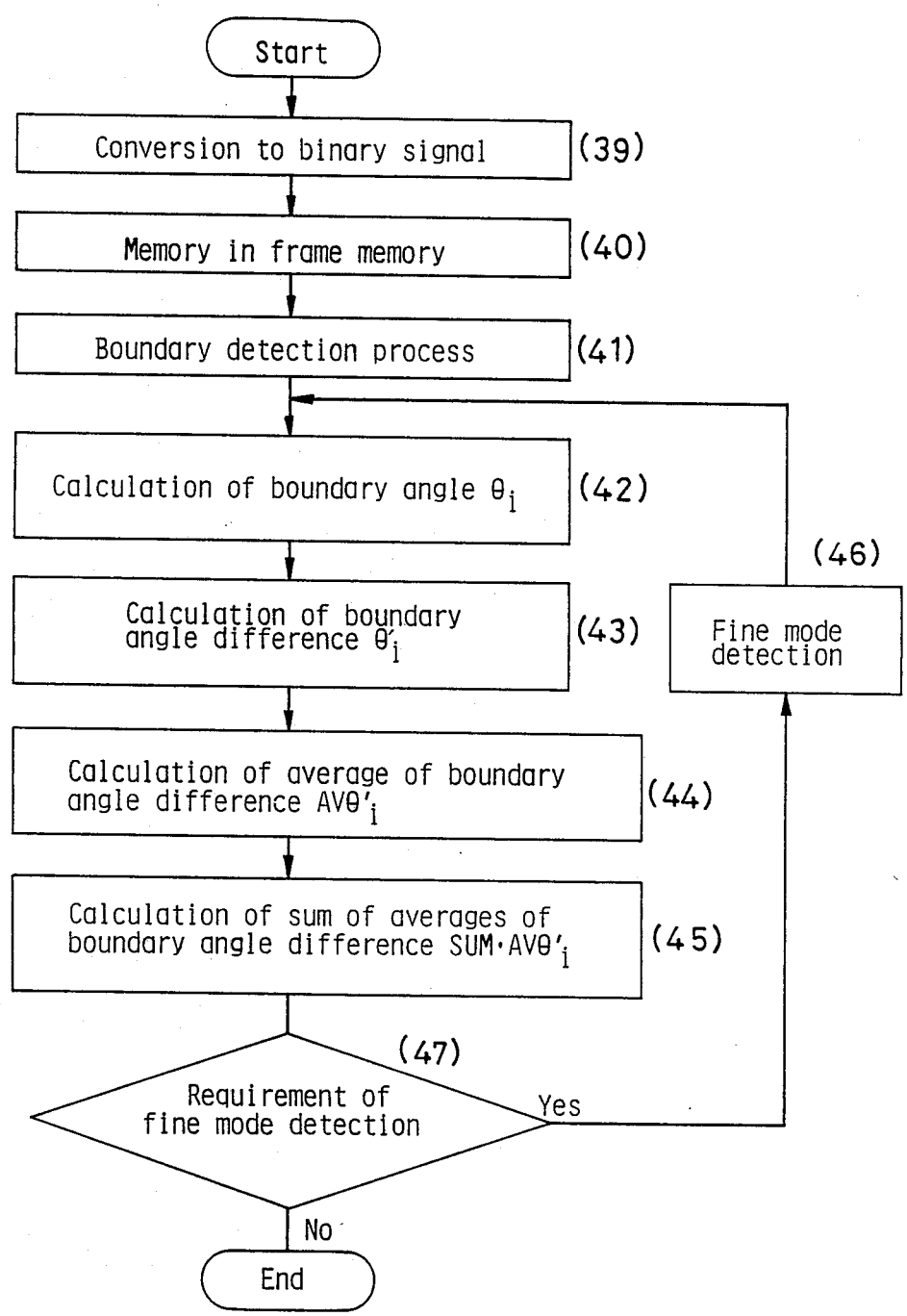
FIG. 2 is a flow chart showing operation of the first embodiment.

The operation of the embodiment is elucidated referring to a flow chart in FIG. 2

Referring to FIG. 1, the image of the object 11 which is detected by the videocamera 13 is inputted to the shape recognition apparatus 14. The image signal is converted to the binary signal showing the silhouette of the object 11 by the image converting circuit 15 and is memorized in the frame memory 16 in steps 39 and 40 of the flow chart, respectively.

Figure 3A:
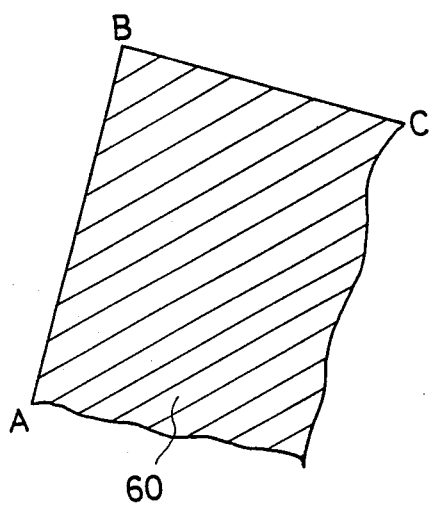
FIG. 3(a) is a plan view of an object.
Figure 3C:
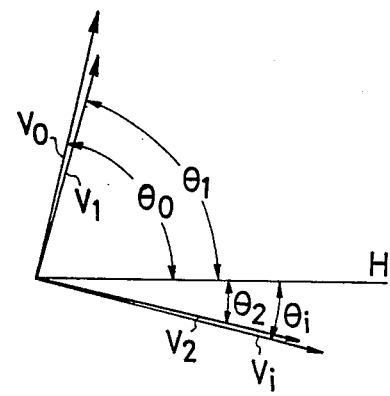
FIG. 3(b) is a figure showing a method for calculating a boundary angle in the embodiment.
Figure 3B:
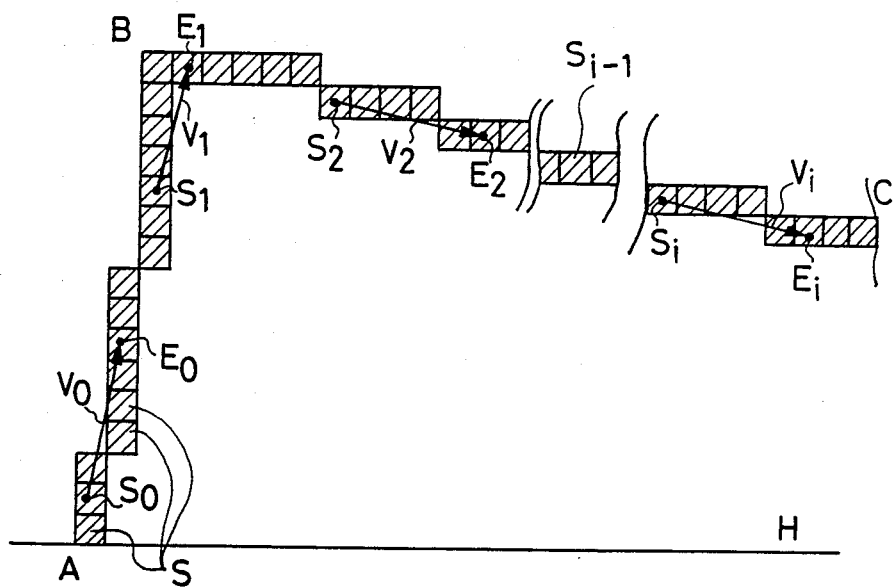
Figure 13A:
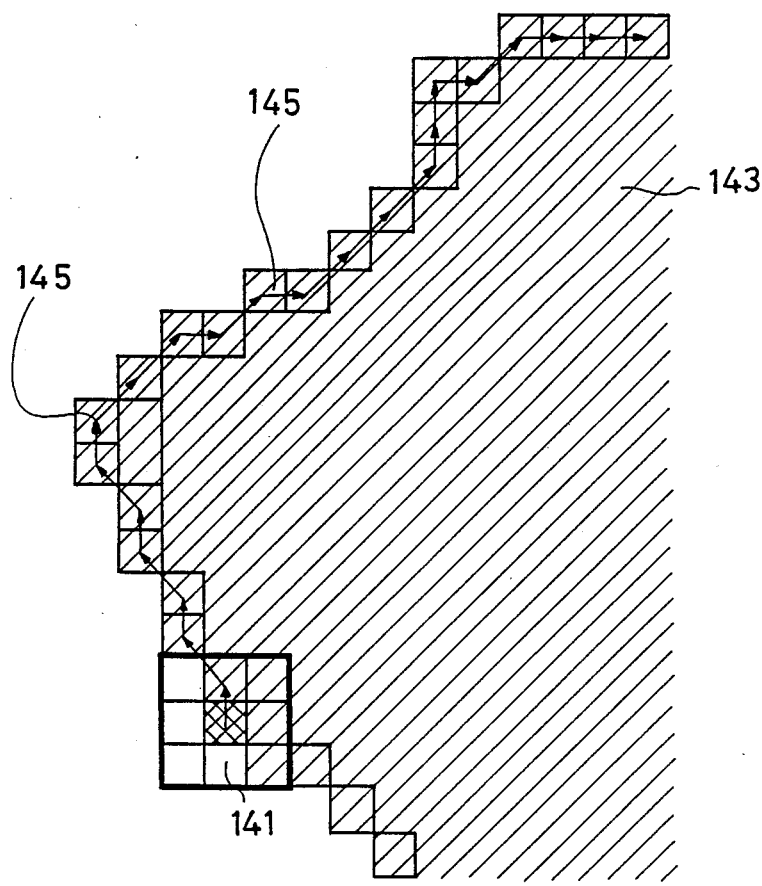
FIG. 13(a) is the figure showing the boundary detection process.
Figure 13B:
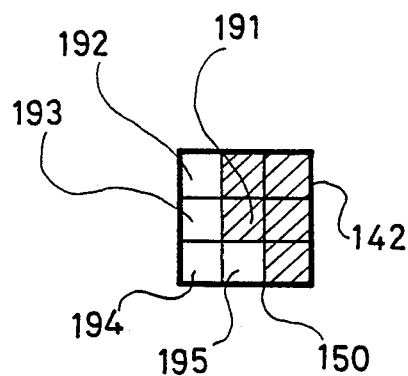
FIG. 13(b) is the figure showing the mask in the boundary detection process.
Figure 14:
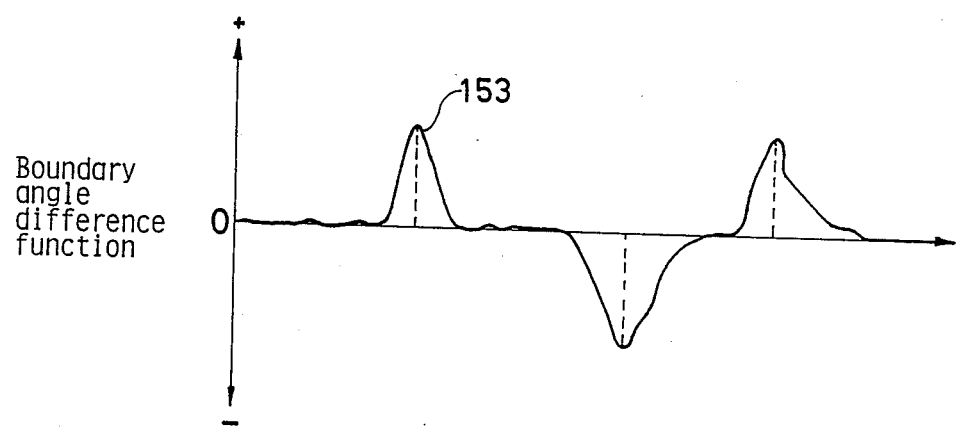
FIG. 14 is the graph showing angle difference function in the prior art.

A basic process of the shape recognition is to obtain information showing position and angle of a corner of the object 11. An example of a corner A-B-C of the object 11 is shown in FIG. 3(a). A boundary detection process as shown described with reference to FIG. 13(a) and FIG. 13(b) is applied to a boundary (or contour) of the corner A-B-C in step 41. In the boundary detection process, the same mask 150 which is formed in the square region formed by the nine square cells 142, for example, is defined as shown in FIG. 13(b), and the boundary of the silhouette 143 is traced by the mask 150. When the cells of the mask are partly hatched, the mask 150 is on a boundary of the silhouette 143 as shown in FIG. 13(a). In the boundary detection process, when at least the central cell 191 exists in the silhouette region 143 and some cells 192-195 are outside of the silhouette 143, it is recognized that the central cell 191 of the mask 150 is on the boundary. The mask 150 is shifted clockwise along the boundary as shown by allows 145. FIG. 3(b) shows one example of the boundary of the part of the corner A-b-C, which is detected by the above-mentioned boundary detection process. Referring to FIG. 3(b), boundary squares S including boundary points are arranged along the boundary of the corner A-B-C in step 41.

At first, a boundary square $S_0$ on the boundary is decided as a starting point. Five boundary squares $S_0$, $S_1$, $S_2$. . . $S_i$ are counted clockwise on the boundary starting from the boundary square $S_0$, and the fifth boundary square is designated an $E_0$. A line connecting the boundary squares $S_0$ and $E_0$ is designated as $V_0$, and an angle $\theta_0$ between the line $V_0$ and a horizontal line H is calculated from data showing positions of boundary squares $S_0$ and $E_0$. Nextly, ten boundary squares are counted from the boundary square $S_0$ along the boundary, and the tenth boundary square is designated as $S_1$. Furthermore, five boundary squares are counted from the boundary square $s_1$, and the boundary square is designated as $E_1$. A line connecting the two boundary squares $S_1$ and $E_1$ is designated as $V_1$, and a boundary angle $\theta_1$ between the line $V_1$ and the horizontal line H is calculated. The ten boundary squares are counted from the boundary squares $S_1$ along the boundary, and the tenth boundary square is designated as $S_2$. Moreover, five boundary squares are counted from the boundary square $S_2$, and the boundary square is designated as $E_2$. A line connecting the two boundary squares $S_2$ and $E_2$ is designated as $V_2$, and a boundary angle $\theta_2$ between the line $V_2$ and the horizontal line H is calculated. In the similar manner, ten boundary squares are counted from the boundary square $S_{i-1}$ along the boundary, and the tenth boundary square is designated as $S_i$. Moreover, five boundary squares are counted from the boundary square $S_i$ and the boundary square is designated as $E_i$. A line connecting the two boundary squares $S_i$ and $E_i$ is designated as $V_i$, and a boundary angle $\theta_i$ between the line $V_i$ and the horizontal line H is calculated. As mentioned above, the boundary angles $\theta_0$, $\theta_1$, . . . $\theta_i$ are calculated along the boundary in step 42 named calculation of boundary angle $\theta_i$. Subsequently, a boundary angle difference $\theta'_i$ which is a difference between neighboring two boundary angles, for example boundary angles between $\theta_i$ and $\theta_{i+1}$, are calculated for all the boundary angles of $\theta_0$, $\theta_1$, . . . $\theta_i$ in the step 43 of the flow chart as shown in FIG. 2

Lastly, an average of boundary angle differences $Av\theta'_1$, which is an average of a predetermined number L of neighboring boundary angle differences $0'_i$, is calculated in the step 44. The number L is decided in accordance with an experimental result, and the number L can be one in case that the shape of the corner does not distort.

Figure 4A:
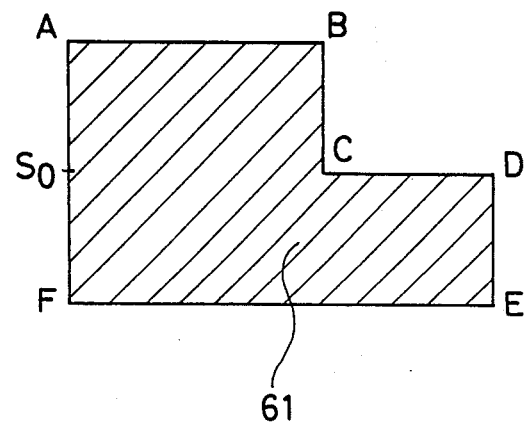
FIG. 4(a) is a silhouette of another object for applying to the embodiment.
Figure 4B:
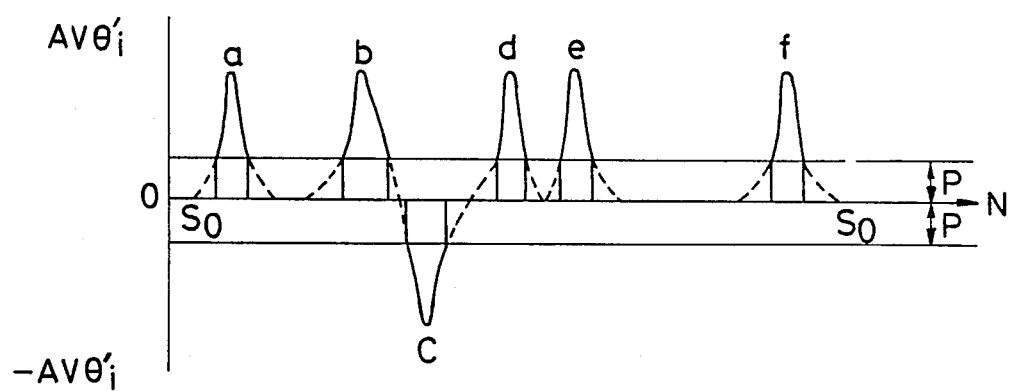
FIG. 4(b) is a graph showing an average of boundary angle differences of the object shown in FIG. 4(a)

Detection of a corner using the average of boundary angle difference $Av\theta'_i$ is elucidated hereinafter. An average of boundary angle difference $Av\theta'_i$ of a silhouette as shown in FIG. 4(a) is shown in a graph as shown in FIG. 4(b). In the graph, positions a, b, c, d, e and f corresponding to corners A, B, C, D, E, and F of the silhouette, respectively, are plotted on an abscissa, and averages of boundary angle difference $Av\theta'_i$ are shown in the ordinate. Referring to FIG. 4(b), where an average of boundary angle difference $Av\theta'_i$ is substantially zero, the boundary is a straight line, and where the average of boundary angle difference $Av\theta'_i$ is not zero, the boundary is a curve or a corner, for example. Therefore, from that $Av\theta'_i$ at a position and at the neighboring position thereto are both zero, it is judged that the boundary between these two positions form a corner. Furthermore, a position where sum of the averages of boundary angle difference $Av\theta'_i$ between neighboring two positions which are zero in the averages of boundary angle difference $Av\theta'_i$ shows an angle of a curved boundary, for example a corner. Therefore, the corner can be recognized by detection of the value of the sum $SumAV\theta'_i$ of the averages of boundary angle difference $Av\theta'_i$ exceeding a predetermined threshold value. Moreover, number of occurrences of the boundary angle difference $\theta'_i$ constituting a corner part shows a curvature of the corner, and when the corner has many occurrences of boundary angle difference $\theta'_i$ the corner has a small curvature. The above-mentioned process is accomplished in a step 45 in FIG. 2.

In the embodiment, in order to clearly distinguish a corner part from a straight line part, a threshold value P is introduced in the graph as shown in FIG. 4(b). The threshold value P is calculated in accordance with the following experimental equation $$P = 2 \cdot \frac{\tan^{-1}\left(\frac{1}{m \cdot n}\right)}{L}. \quad (1)$$

Where, the parameter m shows number of the boundary squares from the boundary square $S_i$ to the boundary square $E_i$, and parameter n shows number of the boundary squares from the boundary square $S_{i-1}$ to the boundary square $S_i$. The parameter L shows number of the boundary angle difference $\theta'_i$ in the process for calculating an average of boundary angle difference $Av\theta'_i$. The equation (1) is introduced from experimental result.

According to the threshold value P which is applied to the graph in FIG. 4(b), such an average value of boundary angle difference $Av\theta'_i$ which is smaller than the threshold value P in absolute value is deemed as zero, and in other words, a boundary of gently wavy line or of slightly concave line and convexity and slightly convex line and deemed as a straight line. In FIG. 4(b), a positive value and a negative value in the average of boundary angle difference show a convexity and a concavity, respectively.

Furthermore, in the embodiment, a double step process for detecting a boundary is applied in order to improve precision of boundary detection. In the double step process, two sets of the parameters m, n and L selected from several sets thereof are used for calculating an average of boundary angle difference $Av\theta'_i$. In a first step, a set of the parameters m, n and L which is suitable for a reference corner is applied to the all boundary, and averages of boundary angle difference $Av\theta'_i$ are calculated. In the process, the ordinary corners are normally detected, but particular portions of plural adjacent corners and a corner having a large curvature radius can not be detected rightly due to inappropriate selection of the set of the parameters m, n and L. An example of inappropriate selection of the parameters is shown in FIG. 5(a) and FIG. 5(b). FIG. 5(a) is a plan view of a silhouette of an object. Averages of boundary angle difference $Av\theta'_i$ of the silhouette as shown in FIG. 5(a) is shown in a graph of FIG. 5(b). The peaks a, b, c, d, e, f and g in the graph correspond to the corners A, B, C, D, E and G of the silhouette, respectively. Referring to FIG. 5(a), the corners A, C, F and G having a comparatively small curvature radius are recognized as normal corners of 90°, but the corners B and E having a comparatively large curvature radius are recognized as corners having a small angle. The corner D is recognized as a corner of 180° since the two corners are close each other.

Then, in case that the corner has a large curvature radius such as corner B and E or two close corners, other set of the parameters m, n and L should be applied to calculate an average of boundary angle difference. The process is shown in step 46 of FIG. 2 as a fine mode detection.

Figure 5:
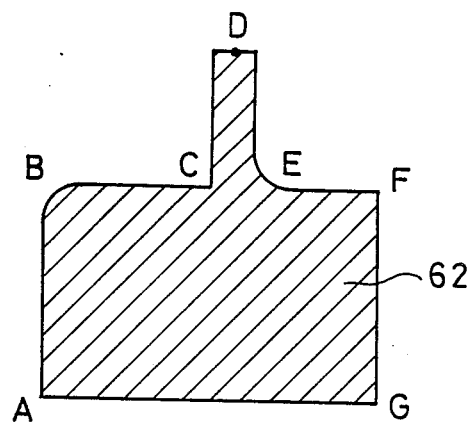
FIG. 5(a) is a silhouette of another object whereto the embodiment is applied.
FIG. 5(b) is a graph showing an average of boundary angle differences of the object shown in FIG. 5(a)
Figure 5:
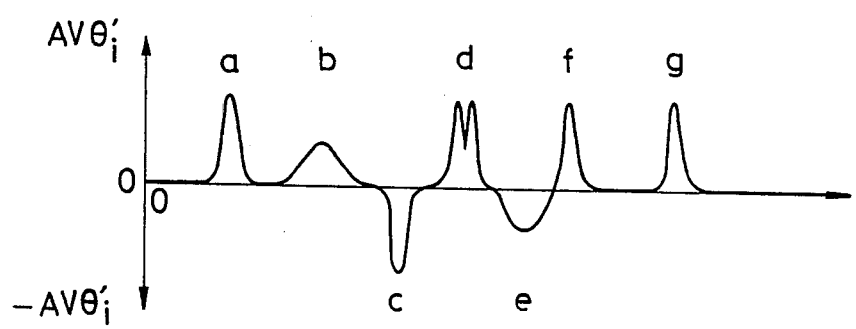
Figure 6:
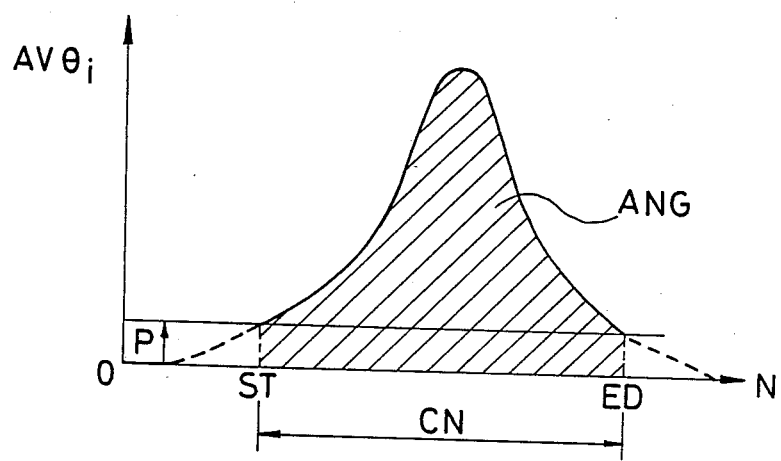
FIG. 6 is an enlarged graph of a part of the graph shown in FIG. 5(b)

FIG. 6 is an enlarged graph of one of the peaks of the graph as shown in FIG. 5(i b). Referring to FIG. 6 number of the boundary squares from a zero average of boundary angle difference $Av\theta'_i$ is shown by CN (from ST to ED), and sum of averages of boundary angle difference $SumAv\theta'_i$ from ST to ED is shown by ANG. When value of ANG is in the range of 90°-180° as a first condition, and when a value of ANG/CN is smaller than a value of r times of the value P which is given by the equation (1) as a second condition, a fine mode detection is selected. (The value r is experimentally decided.) In the fine mode detection, the set of the parameters m, n and L is changed.

Figure 7A:
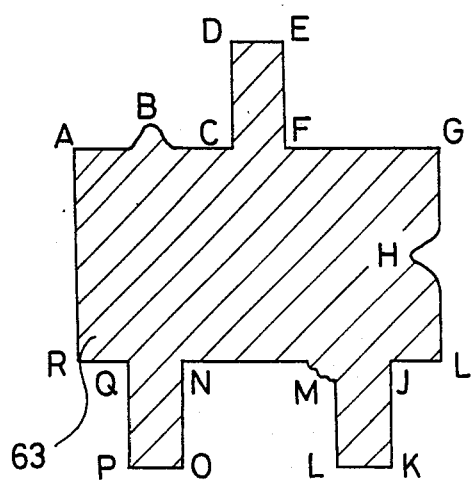
FIG. 7(a) is a silhouette of a reference pattern whereto the embodiment is applied.
Figure 7B:
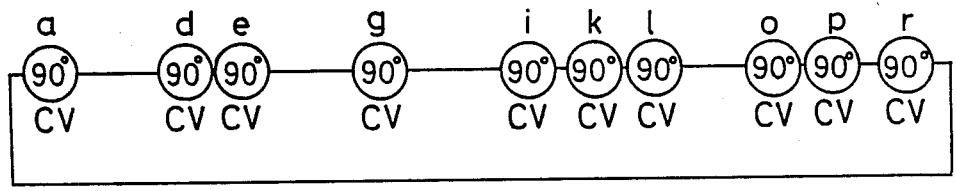
FIG. 7(b) is a reference table showing data of the shape of the reference pattern as shown in FIG. 7(a)

A process for recognizing shape is elucidated hereafter. At first, a reference shape table which has data of a reference model of a shape is registered in the reference shape table 19 by a method elucidating hereinafter referring to FIG. 7(a) and FIG. 7(b). A sample shape 63 for forming a reference shape table is shown in FIG. 7(a). Averages of boundary angle difference $Av\theta'_i$ and a sum of averages of boundary angle difference $Sumav\theta'_i$ of the respective corners of the sample shape 63 are calculated prior to forming the reference shape table. Then, corners which are larger than a predetermined value in the sum of averages of boundary angle difference $SumAv\theta'_i$ are selected for forming the reference shape table, and remainder of the corners are excepted from consideration. Referring to FIG. 7(a), corners B, H and M are excepted, for example. Furthermore, corners which have the negative sum of averages of boundary angle difference $Sum Av\theta'_i$ and is not so important for specifying the shape are also excepted (for example, corners C, F, J, N and Q). As a result, the corners A, D, E, G, I, K, L, O, P and R are employed as reference corners. The sum of averages of boundary angle difference $SumAv\theta'_i$ of the respective corners are calculated and are memorized in the reference table 19 as the reference shape table. The reference shape table is shown by a symbolic representation in FIG. 7(b). Corners a, d, e, g, i, k, l, o, p and r correspond to the respective corners A, D, E, G, I, K, L, O, P and R in FIG. 7(a). The numerals given in the respective corners in FIG. 7b) represent angles of the respective corners, and letters CV represent a convex corner. Distances between the respective neighboring two corners a, d, e . . . o, p, r correspond to distances between the respective neighboring two corners A, D, E . . . P and R of FIG. 7(a). In FIG. 7(b), only the distance between the corners a and r does not correspond to the distance between corners A and R in FIG. 7(a).

Figure 7C:
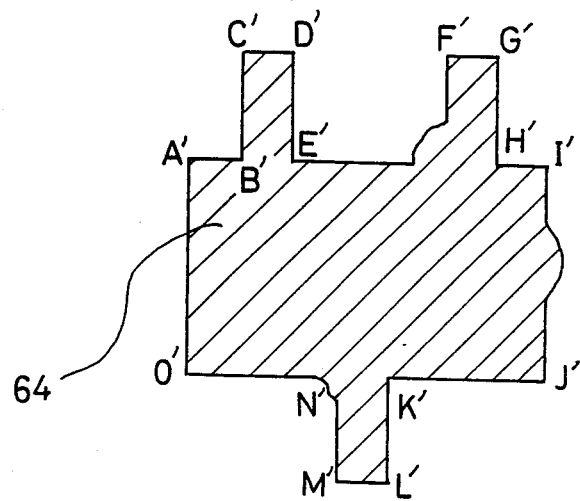
FIG. 7(c) is a silhouette of an object corresponding to the reference pattern.
Figure 7D:
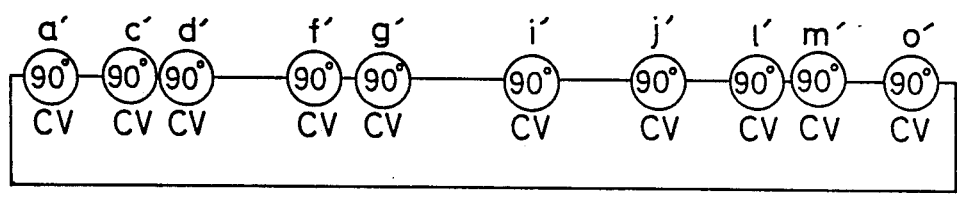
FIG. 7(d) is a detected table showing data of the shape of the object as shown in FIG. 7(c)

Secondly, a coincidence or conformity process between the reference shape table and a shape of an unknown object is elucidated hereinafter. A silhouette 64 of the object is shown in FIG. 7(c). The silhouette 64 in FIG. 7(c) is rotated about 180° with respect to the reference shape 63 as shown in FIG. 7(a). The sum of averages of boundary angle difference SumAv$\theta'_i$ of the silhouette 64 are calculated and the respective corners are recognized. Referring to FIG. 7(d), the corners a', c', d', f', g', i', J', l', m' and o' correspond to the corners A', C', D', F', G', I', J', L', M' and O' of the silhouette 64 in FIG. 7(c), respectively. The corners b', e', h', k' and n' are not shown in the symbolic representation in FIG. 7(d), since the sum of averages of boundary angle difference SumAv$\theta'_i$ of the corners B', E' . . . N' are negative.

The conformity process is accomplished by comparing two symbolic representations as shown in FIG. 7(b) and FIG. 7(d).

Referring to FIG. 7(b) and FIG. 7(d), the corners a, d . . . o, p and r of the reference table are compared with the corners a', c' . . . l', m' and o', respectively, under supposition that the corner a corresponds to the corner a'. However, since a distance between a and d does not conform with a distance between a' and c', conformity between two symbolic representations is not realized. Nextly, the above-mentioned conformity process is accomplished under supposition that the corner a correspond to the corner o', and a distance between the corner c' and d'. As mentioned above, the periodic comparison of the two corners is prosecuted sequentially in the order a', c', d', f', g', i', j', l', m' and o'. As a result, when the corner j' is selected for corresponding to the corner a, a distance between two corners a and d conforms with the distance between the corner j' and l'. Furthermore, a distance between the corner d and e conforms with a distance between the corners l' and m'. In the similar manner, when the respective distances between the two corners of unknown shape conform with the respective distances between the two corners of reference table, the conformity between the unknown shape and the reference table is recognized.

In the above-mentioned example, the angles of the respective corners has been 90° and the corners contain both concave corners and convex corners. Therefore, comparison in the angle and the shape of the corners are prosecuted in the conformity process.

Figure 8:
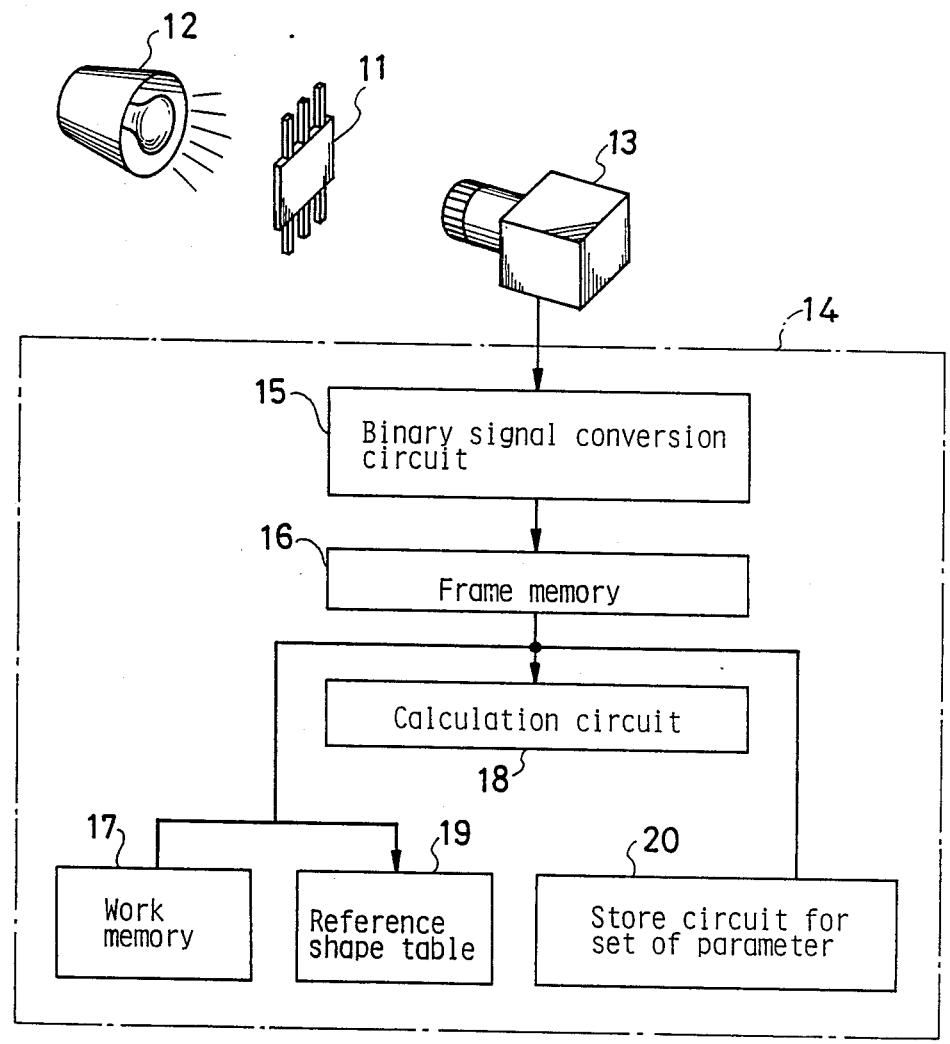
FIG. 8 is a block diagram of a shape recognition apparatus of a second embodiment in accordance with the present invention.

A second embodiment in accordance with the present invention is shown in FIG. 8. Referring to FIG. B, a binary signal conversion circuit 15, a frame memory 16, a calculation circuit 18, a work memory 17 and a reference table 19 are identical with or similar to those of the first embodiment. Therefore, elucidations thereof are omitted here. In the second embodiment, a store circuit for sets of parameters 20 is provided in the shape recognition apparatus 14.

As mentioned above, in FIG. 5(a), in order to detect the corner D, a change of the set of the parameters m, n and L is required. In the embodiment, a plurality of sets of the parameters m, n and L are formed and is registered in the store circuit for the sets of parameters 20. Then, a set of the parameters m, n and L which is suitable for a shape of an object is automatically selected from the store circuit for the set of parameter 20. In the embodiment, various corners which are small or large in curvature radius or width can be rightly recognized. Furthermore, the angle of the corners can be rightly detected by calculating the sum of averages of boundary angle difference Sumav$\theta'_i$, by using the most suitable set of the parameters m, n and L.

Figure 9:
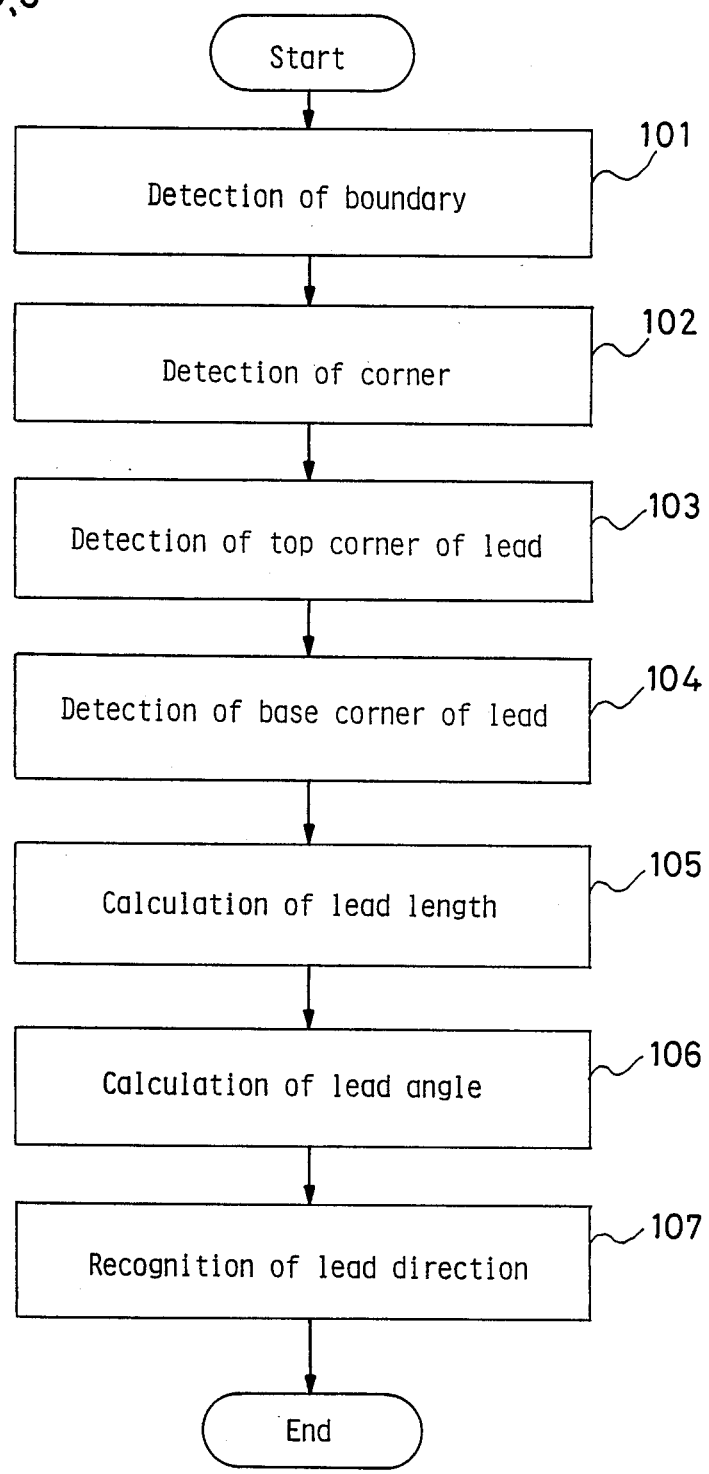
FIG. 9 is a flow chart showing a process of a third embodiment in accordance with the present invention.

A third embodiment of the shape recognition apparatus in accordance with the present invention is shown in FIG. 9. In the embodiment, the constitution of the apparatus is identical with the first embodiment as shown in FIG. 1. A corner detection process, detection of a lead of a integrated circuit and recognition process of the lead are accomplished in the calculation circuit 18, and which process is shown by a flow chart in FIG. 9

The boundary detection process is accomplished in step 101 which corresponds to steps 39, 40 and 41 in FIG. 2.

Nextly, a corner detection process which is accomplished in step 102 is elucidated hereinafter.

The corner detection process is divided to the process for calculating the average of boundary angle difference Av$\theta'_i$ and a process for deciding a position of the corner by the average of boundary angle difference Av$\theta'_i$. The average of boundary angle difference Av$\theta'_i$ is calculated by the process as shown in FIG. 3.

Detection of a position of the corner at the top of the lead is processed in step 103. In the detection process, since a boundary angle changes 180° adjacent to the top of the lead (convex corners of 180°), a corner which is about 180° in the sum of averages of boundary angle difference SumAv$\theta'_i$ is detected as a corner of the top of the lead.

Figure 10:
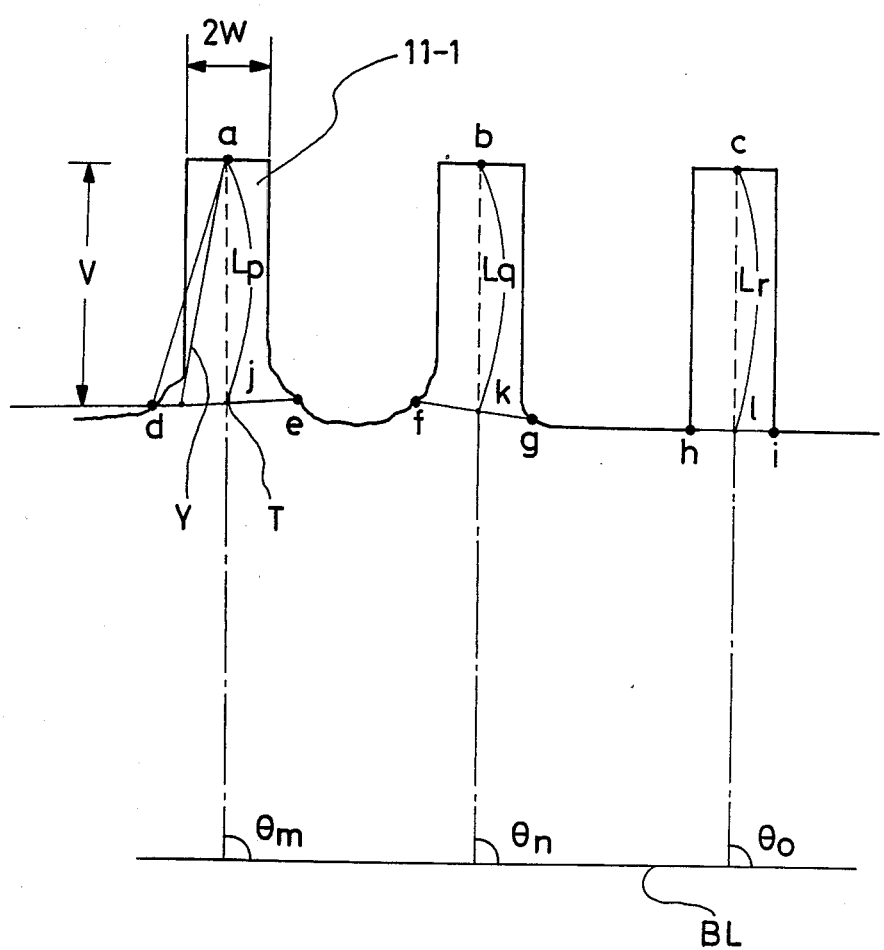
FIG. 10 is a silhouette showing calculation of length and direction of lead in the third embodiment.
Figure 11:
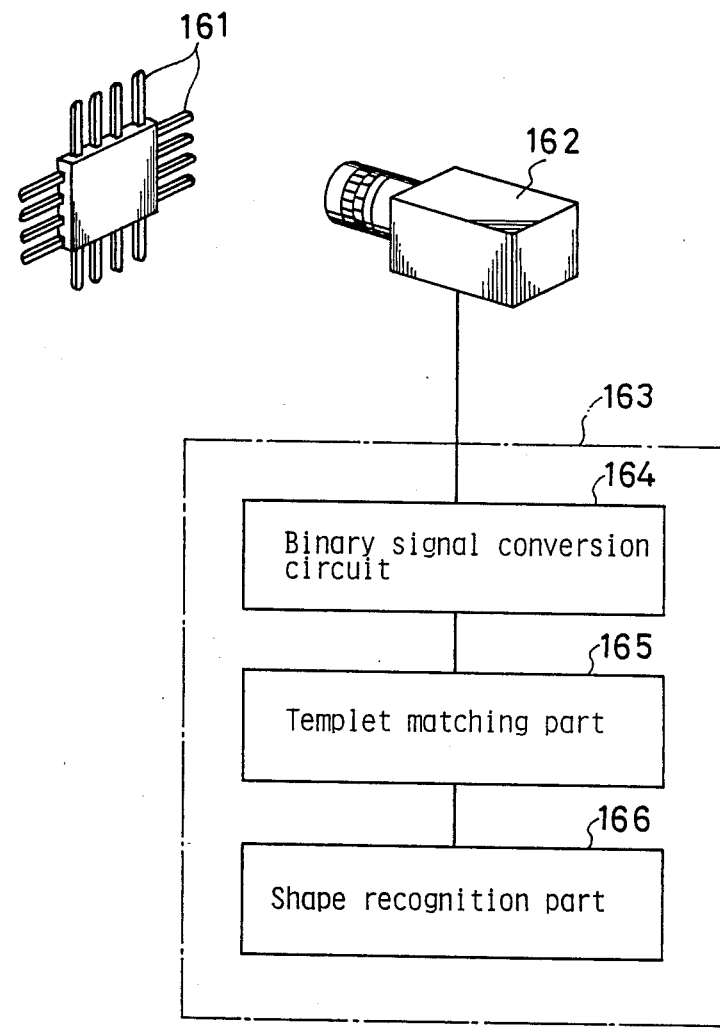
FIG. 11 is the block diagram showing the shape recognition apparatus in the prior art.
Figure 12A:
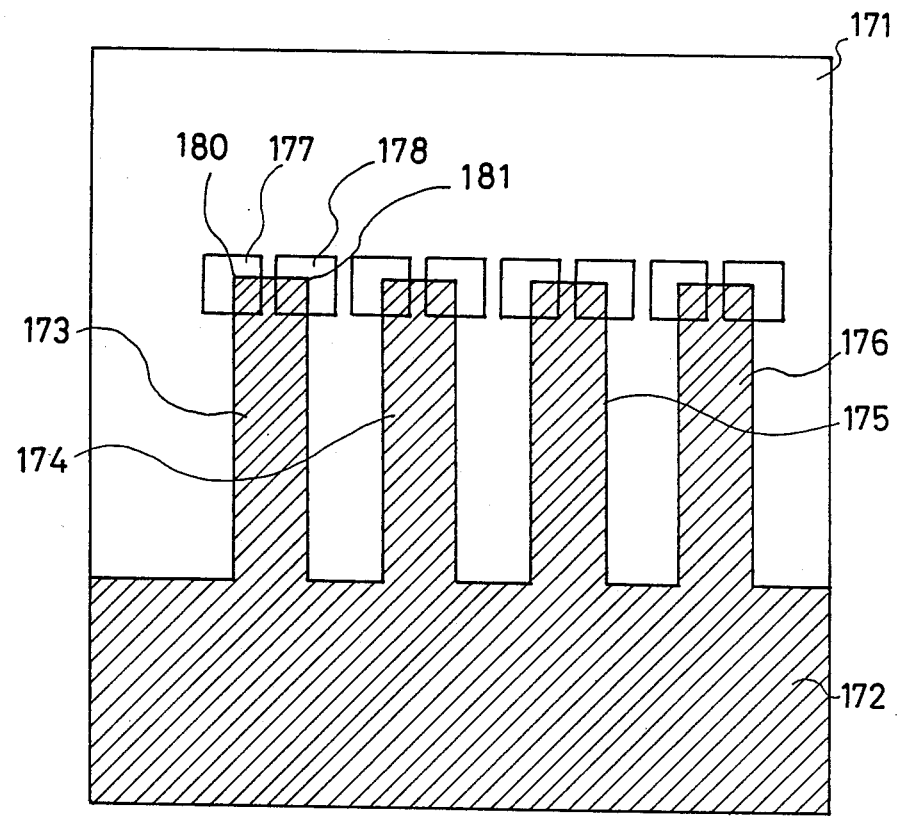
FIG. 12(a) is the silhouette showing leads of the integrated circuit in the prior art.
Figure 12B:
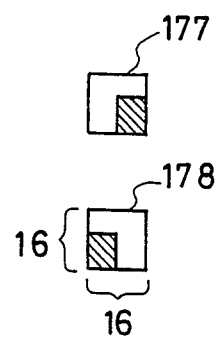
FIG. 12(b) is the figure showing reference patterns in the prior art.

An example of a lead 11-1 is shown in FIG. 10. Referring to FIG. 10, the lead 11-1 is 2W is width and V in length, and the values of the width and length are previously registered in the working memory 17. Subsequently, a distance Y is calculated from the width W and length V using pythagorean proposition. The distance Y is also registered in the working memory 17. The corner of the base of the lead 11-1 is detected under the condition wherein a difference between a distance of line ad and Y is within a predetermined value, and an average of boundary angle difference is negative, in a step 104. As a result, the corner of the base of the lead 11-1 is recognized.

In the embodiment, since usually two concave corners exist at the base side of the lead, the lead is recognized when the two corners are detected.

In FIG. 10, a central point T between points e and d is calculated as a center of the two corners at the base of the lead. A length of the lead Lp is detected by the distance between the top of the lead and the central point T in step 105 of FIG. 9. Furthermore, an angle of the line aT with respect to a base line BL is calculated in a step 106 of FIG. 9. The angle $\theta_m$ shows a lead direction. Moreover, the detected length of the lead is compared with the value V. The detected length of the lead does not coincide with the value V, the lead is recognized as a flash or a distorted lead.

The base line BL is a specified scanning line in video camera 13, for example. The angle $\theta_m$ shows the direction of the lead. For example, when the angle $\theta_m$ is about 90°, the lead faces upward as shown in FIG. 10. In case of about 0° or 180° of the angle $\theta_m$, the lead faces leftward or rightward, respectively, and in case of about $-90°$, the lead faces downward. The above-mentioned process is prosecuted in step 107. As a result, the leads of the dual in-line package, the quad in-line package or the like can be recognized by the shape recognition apparatus in accordance with present invention.

The calculation circuit 18 is recommended to comprise or to be constituted by a computer system, and the respective process is controlled by suitable computer programs.

What is claimed is:

1. A shape recognition apparatus comprising:
   a video device for detecting a shape of an object, to produce a video signal indicative of the shape;
   means for converting the video signal into a binary signal;
   means for detecting a boundary point to be noted on a contour of the shape shown in the binary signal;
   means for producing data indicative of a row position of boundary points, starting from the boundary point to be noted and along the contour of the shape;
   means for forming a shape table including data of the shape and direction of corners on the contour, and distances between the respective neighboring corners from data of the row of said boundary points, said shape forming means comprising:
   means for calculating an angle between a base line and a line connecting between two boundary points of a first predetermined number,
   means for calculating an angle between the base line and a line connecting a boundary point of the first predetermined number from a particular boundary point and a boundary point counted a second predetermined number from the boundary point from one of said two boundary points,
   means for calculating respective angles between the base line and respective lines connecting between respective boundary points of the first predetermined number from respective boundary points and the respective boundary points counted the second predetermined number of the boundary from one side of respective ones of boundary points,
   means for calculating respective differences of angles between respective neighboring lines,
   means for calculating an average of a predetermined number of said differences, and
   means for calculating a sum of said averages between two boundary portions which are zero in said differences; and
   means for recognizing the shape of the object by comparing said shape table with a reference shape table.

2. A shape recognition apparatus comprising:
   a video device for detecting a shape of an object, to produce a video signal indicative of the shape;
   means for converting the video signal into a binary signal;
   means for detecting a boundary point to be noted on a contour of the shape shown in the binary signal;
   means for producing data indicative of a row position of the boundary points starting from the boundary point to be noted and along the contour of the shape;
   means for forming a shape table including data of the shape and direction of corners on the contour, and distances between the respective neighboring corners from data of the row of said boundary points, said shape table forming means comprising:
   means for calculating an angle between a base line and a line connecting between two boundary points of a first predetermined number,
   means for calculating an angle between the base line and a line connecting between a boundary point of the first predetermined number from a particular boundary point and the boundary point counted a second predetermined number of the boundary point from one of said two boundary points,
   means for calculating respective angles between the base line and respective lines connecting between respective boundary points of the first predetermined number from respective boundary points and the respective boundary points counted the second predetermined number of the boundary point from one side of respective said two boundary points,
   means for calculating respective differences of angles between respective neighboring lines,
   means for calculating an average of a third predetermined number of said differences, and
   means for calculating a number of the boundary point included between the boundary portions being zero in said difference; and
   means for recognizing the shape of the object by comparing said shape table with a reference shape table.

3. A shape recognition apparatus in accordance with claim 1, wherein
   said means for recognizing the shape detects a position of a part of the shape by using a predetermined shape table comprising a plurality of the corners.

4. A shape recognition apparatus in accordance with claim 1 or 2, wherein said first predetermined number and second predetermined number are variable.

5. A shape recognition apparatus in accordance with claim 1 or 2, wherein said first predetermined number and second predetermined number are automatically varied based on said average of a third predetermined number of differences.

6. A shape recognition apparatus in accordance with claim 1 or 2, further comprising
   means for varying said first predetermined number, second predetermined number and third predetermined number based on said sum of said averages between two boundary portions being zero in said differences and a number of the boundary point, and
   a memory for memorizing said first predetermined number, said second predetermined number and said third predetermined number.

* * * * *